United States Patent
Prabhudeva (10) Patent No.: US 11,125,570 B2
(45) Date of Patent: Sep. 21, 2021

(54) METHOD AND APPARATUS FOR IMPROVED TOLL-BOOTH VEHICLE HANDLING

(71) Applicant: FORD GLOBAL TECHNOLOGIES, LLC, Dearborn, MI (US)

(72) Inventor: Raghu Prabhudeva, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 344 days.

(21) Appl. No.: 16/155,366

(22) Filed: Oct. 9, 2018

(65) Prior Publication Data

US 2020/0109955 A1    Apr. 9, 2020

(51) Int. Cl.
| | | |
|---|---|---|
| G01C 21/34 | (2006.01) | |
| G07B 15/06 | (2011.01) | |
| G08G 1/01 | (2006.01) | |
| G06Q 20/28 | (2012.01) | |

(52) U.S. Cl.
CPC ........ *G01C 21/3407* (2013.01); *G06Q 20/28* (2013.01); *G07B 15/063* (2013.01); *G08G 1/0129* (2013.01); *G08G 1/0145* (2013.01)

(58) Field of Classification Search
CPC .. G01C 21/3407; G06Q 20/28; G07B 15/063; G08G 1/0129; G08G 1/0145
USPC .......................................................... 701/117
See application file for complete search history.

(56) References Cited

U.S. PATENT DOCUMENTS

| | | | |
|---|---|---|---|
| 10,403,133 B1* | 9/2019 | Christensen | G08G 1/0145 |
| 2015/0066355 A1* | 3/2015 | Siegel | G01C 21/3492 |
| | | | 701/410 |
| 2015/0339919 A1* | 11/2015 | Barnett | H05B 47/125 |
| | | | 340/907 |
| 2016/0189174 A1* | 6/2016 | Heath | G06Q 30/0201 |
| | | | 705/7.29 |
| 2018/0143033 A1* | 5/2018 | Hu | G01C 21/3658 |
| 2019/0164357 A1* | 5/2019 | John | G01C 21/3658 |
| 2019/0204100 A1* | 7/2019 | Sharma | G08G 1/09685 |
| 2019/0325743 A1* | 10/2019 | Nishioka | G08G 1/0145 |
| 2019/0389463 A1* | 12/2019 | Mizutani | B60W 30/165 |
| 2020/0043248 A1* | 2/2020 | Satyanarayana | G06Q 20/4016 |

OTHER PUBLICATIONS

Mahalingam et al., "A Mobile Crowd Sensing framework for Toll Plaza Delay Optimization", WCI '15, Proceedings of the Third International Symposium on Women in Computing and Informatics, Aug. 10-13, 2015, pp. 180-185, Kochi, India.

Hu et al., "SmartRoad: Smartphone-Based Crowd Sensing for Traffic Regulator Detection and Identification", ACM Transaction on Sensor Networks, vol. 11, No. 4, Article 55, Publication date: Jul. 2015, 27 pages, New York, NY, USA.

* cited by examiner

*Primary Examiner* — Krishnan Ramesh
(74) *Attorney, Agent, or Firm* — Michael Spenner; Brooks Kushman P.C.

(57) ABSTRACT

A system comprising a processor configured to advise a vehicle occupant of an advisable route through a tollbooth determined based on tollbooth traffic, responsive to identifying a vehicle as being within a threshold distance of a tollbooth. The processor is also configured to offer an option for toll prepayment responsive to the advisable route corresponding to a prepaid toll lane.

6 Claims, 5 Drawing Sheets

METHOD AND APPARATUS FOR IMPROVED TOLL-BOOTH VEHICLE HANDLING

TECHNICAL FIELD

The illustrative embodiments generally relate to methods and apparatuses for improved toll-booth vehicle handling.

BACKGROUND

There is a large incentive to include toll booths on roads, as it helps generate revenue directly attributable to road-use, which in-turn can be repurposed to maintenance of the same road. While this is a good solution for solving the issue of paying for road repairs, during certain times the booths present an impediment to high-flowing traffic. Since many or most drivers need to slow down or stop to pay a toll, the system can tend to create artificial back-logs in traffic.

One solution to this problem was introduced in the form of radio frequency identifier (RFID) transponders for vehicles, which sends a signal so the transponder owner's account can be charged, allowing more rapid travel through toll booths for a subset of the population. Unfortunately, many, if not most, travelers do not have such tags, and thus the primary result of many toll booths is still a slow-down in traffic that is not directly related to a traffic condition.

For the average driver that does not want a transponder or may only periodically encounter a toll booth, it can be difficult to plan travel through the booth in a way that meaningfully improves travel time. It can also be risky to switch-lanes at the last minute, as a few lanes of traffic often turn into many lanes at the booth. Last-minute switching may not significantly improve throughput and may result in erratic behavior that presents a problem for other drivers.

SUMMARY

In a first illustrative embodiment, a system comprising a processor configured to advise a vehicle occupant of an advisable route through a tollbooth determined based on tollbooth traffic, responsive to identifying a vehicle as being within a threshold distance of a tollbooth. The processor is also configured to offer an option for toll prepayment responsive to the advisable route corresponding to a prepaid toll lane.

In a second illustrative embodiment, a system includes a processor configured to determine that a vehicle is within a threshold distance of a first tollbooth for which less than a threshold amount of traffic data, predefined as sufficient to enable modeling, is presently available. The processor is also configured to utilize a secondary data source, determined based on a data-type used for the threshold determination, for traffic projection. Further, the processor is configured to provide an in-vehicle prepayment option responsive to automatic toll prepayment being recommended based on the traffic projection.

In a third illustrative embodiment, a system includes a processor configured to determine that a vehicle is within a threshold distance of a first tollbooth for which less than a threshold amount of traffic data is presently available. The processor is also configured to utilize a secondary data source, determined based on a data-type used for the threshold determination, for traffic projection. Additionally, the processor is configured to determine, based on the traffic projection, a recommended lane for passage through the tollbooth and recommend the determined lane to a driver.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
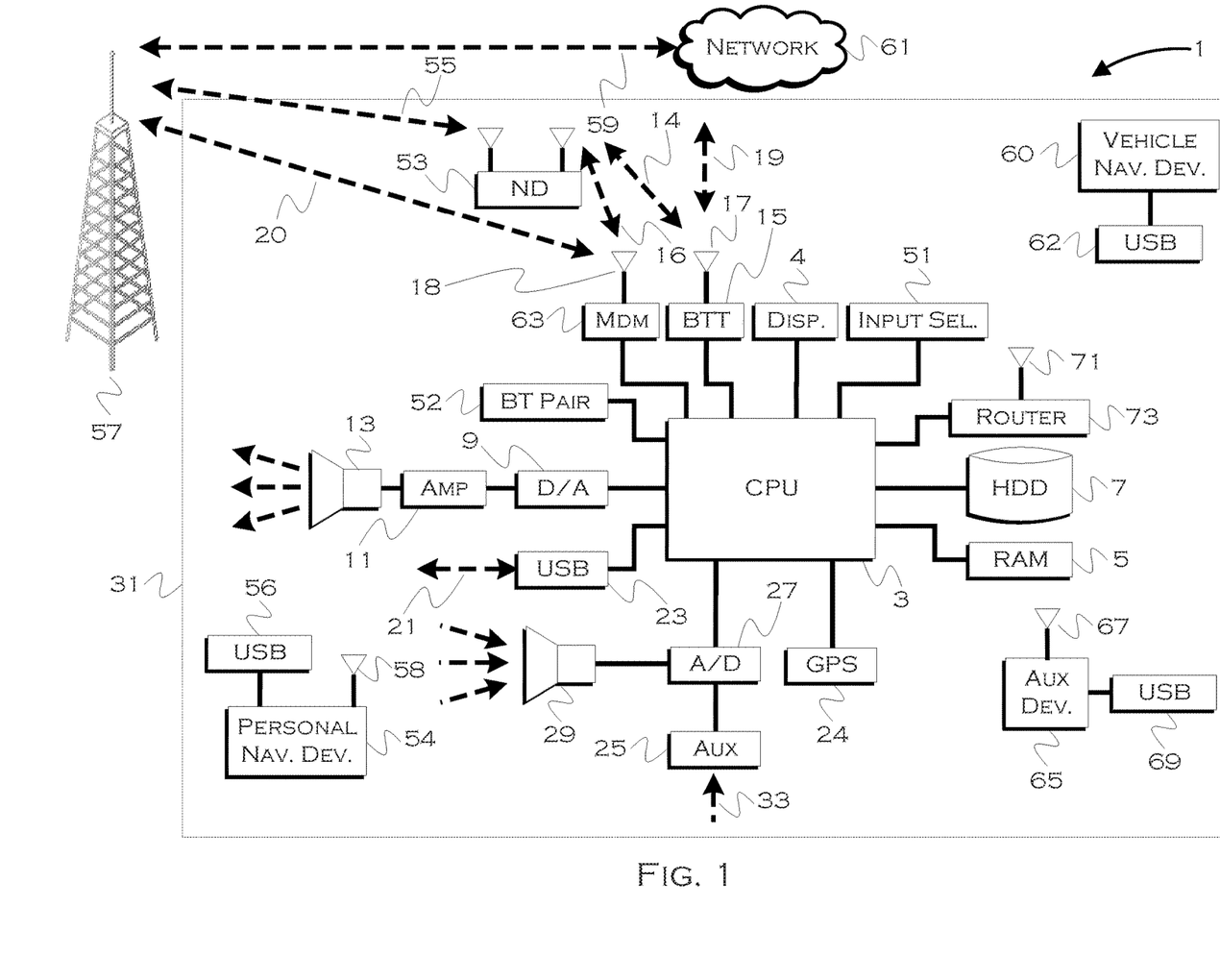
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Toll booths provide a significant revenue service to road-maintaining entities, but this comes at the cost of slowing traffic and creating unintentional traffic backups. Most toll booths have multiple lanes of choice, some including a "pass through" lane where an RFID transponder can be used to pay a toll quickly, via radio signal identifying a vehicle, as a vehicle moves through the lane at speed. Other options include a cash-only lane, any form of payment lanes, and credit card lanes.

When approaching a toll booth in even moderate traffic, a driver without an automatic pass-through option has a choice to make about which lane to take. It is not always apparent which lane will be moving most quickly, or even how much traffic is in a particular lane. This also typically involves last-second decision-making, which is always an option for a driver to create a hazardous situation with an unanticipated maneuver. By predicting lane congestion, booth congestion and providing an option for automatic payment, the illustrative embodiments improve the current model by both flowing traffic through less occupied lanes (via recommendation, at least) and/or allowing a driver to pre-pay a toll, which can either allow the driver to use the pass-through lane or speed up the handling of the driver's toll in another lane.

The illustrative embodiments can use real-time and historical data to predict booth congestion, which can in turn allow recommendations for both lane selection and for automatic payments. Lane optimization algorithms may also consider a next-maneuver after a booth, since toll booths are often placed at interchanges, and a driver at a busy booth may not want to cut across six lanes of booth-exiting traffic to reach a necessary bypass or next-road. That is, a driver may be optimized for the "fastest of the recommended" lanes for a next-maneuver, as opposed to simply the fastest lane.

Figure 2:
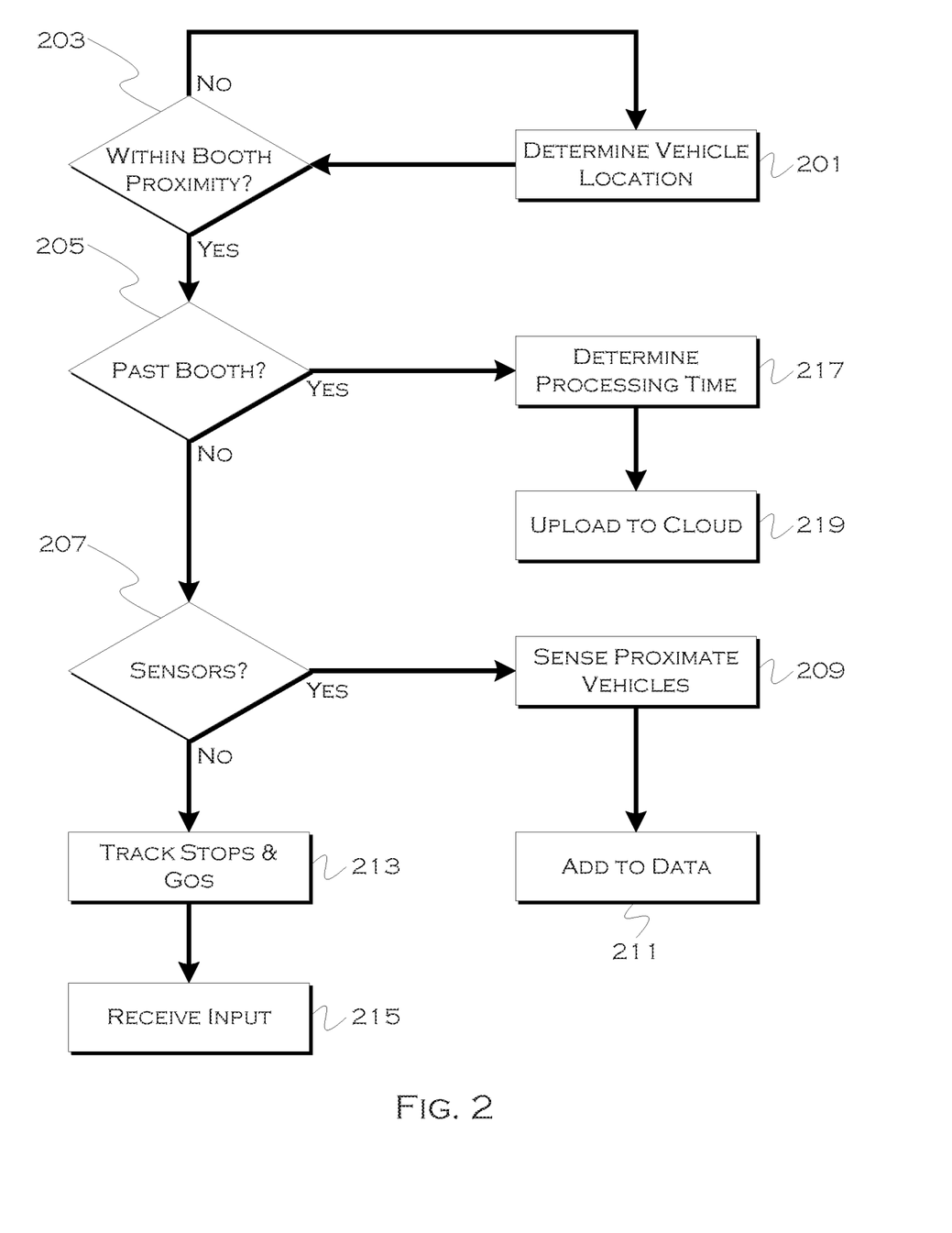
FIG. 2 shows an illustrative process for traffic detection within a booth-zone.

FIG. 2 shows an illustrative process for traffic detection within a booth-zone. In this example, the process determines 201 a vehicle location. Since the process, in this example, is only interested in traffic at a booth, the location can be set in some proximity to the toll booth for purposes of determining whether or not the vehicle will be affecting, observing or experiencing traffic related to the toll booth. These can be distinct zones of difference, if desired, and may be based on an observation of how and when to observe traffic for a given booth in order to achieve reasonable analysis. In this example, the process determines 203 whether or not the vehicle is within 203 a defined proximity to the toll booth, based on detection fence, range, point, etc. The traffic determination can be based on currently observed traffic, traffic observed within a predefined prior time period, or predicted traffic based on historical data, for example.

If the vehicle is within the defined proximity, the process may also determine if the vehicle has passed the booth 205. Because GPS is not yet perfectly accurate, a region around a booth may need to be over-expansively defined. This can result in coordinates outside the preferred range of consideration, but which ensures that preferred results are captured with a high degree of likelihood. So, for example, if the range of error is 50 feet, then the fence might be 50 feet larger than preferred if range was perfect. Thus, a secondary determination about whether a vehicle has passed a booth may be useful in removing results that do not affect, or have a lesser effect on, booth traffic.

If the vehicle is past the booth, the process may determine 217 a total processing time, which is the amount of total time it took the vehicle to go from some point to the booth exit. This can give a sense of the average processing time, and can be useful even if other determinations about traffic cannot be easily made. This, along with other data gathered through the process, is then uploaded 219 to the cloud for crowd-sourcing.

If the vehicle is not past the booth, the process may then determine 207 if the vehicle has sensors that can be used to detect other vehicles. This can include park-assist sensors, radar, lidar, cameras, etc. If the vehicle has sensors that can be used to detect other vehicles, the process can use those sensors to sense 209 proximate (forward, rearward, sideward, etc.) vehicles and add 211 this sensor data to the set for upload.

The process may also track 213 stops and vehicle GPS location, to get a trail of "breadcrumbs" which indicate a vehicle path and vehicle stop and go traffic, which can give a sense of how many vehicles are processed in a given lane in which the vehicle currently resides. The process can also receive 215 input from a user, which can allow the user to define traffic conditions or other variables not otherwise detected, or more accurately than detected.

All of this data can be added to a data-packet for upload, and cloud processing can compile results to build a real-time traffic profile of a given toll stop. This data can also be added to a historical record, for times when real-time data is not available, and for estimation of conditions at other booths where real-time data is not available. Weather, construction and other data can also be considered for real-time and historical purposes.

Figure 3:
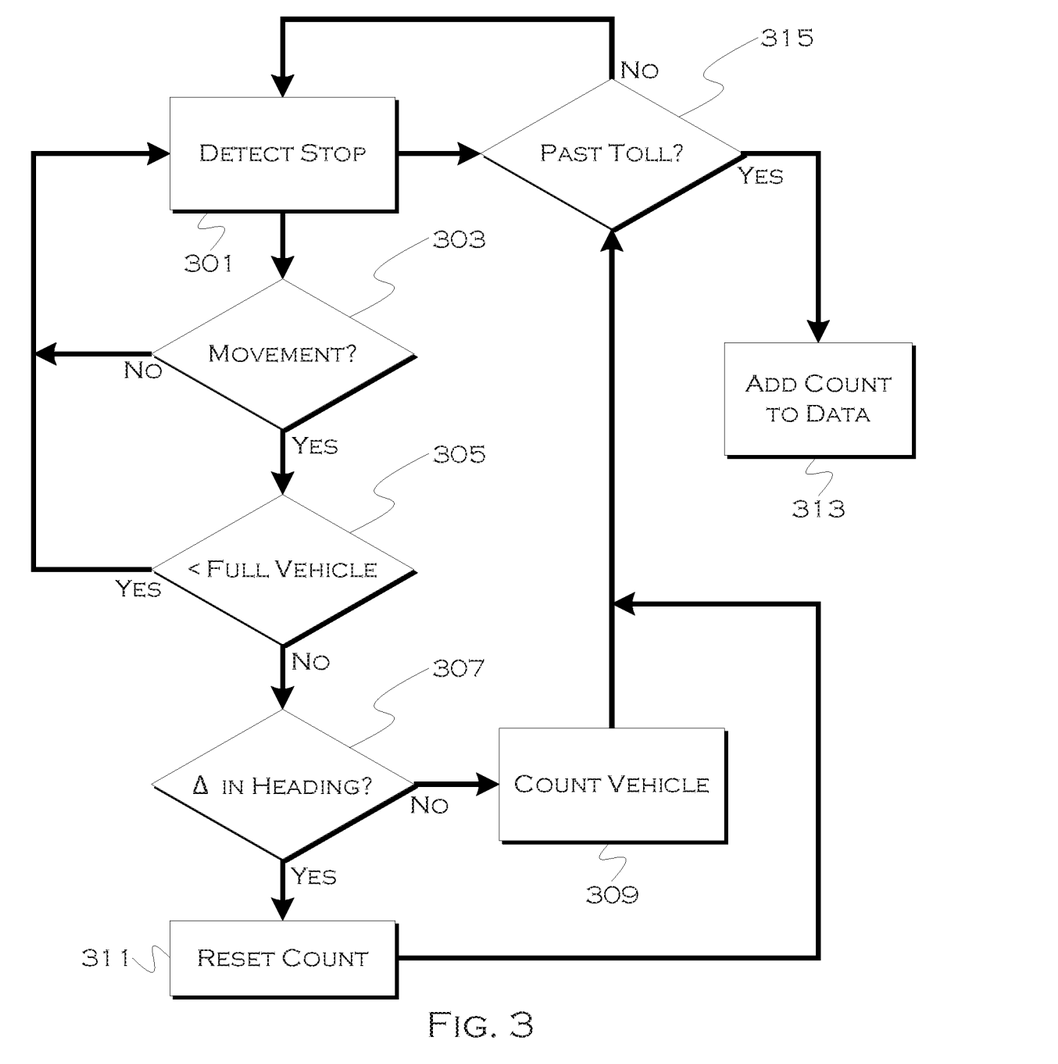
FIG. 3 shows an illustrative process for traffic detection.

FIG. 3 shows an illustrative process for traffic detection. In this example, the process attempts to determine the number of vehicles in a line of traffic based on detected stops. This can be useful for determining how many vehicles are in a given lane at a toll booth, assuming the object (detecting) vehicle, also called the ego vehicle, can be reasonably accurately placed within a lane. Here, the process detects 301 a vehicle stop, which is an indicator that the vehicle has either reached a booth or is stopped in a line of traffic. If there is movement 303, the process may determine if a full vehicle length (or more) has been moved 305. If less than a full vehicle length has been moved, the process will continue to track movement. Because vehicles are not all the same length, a value representative of a full vehicle length could be considered instead. If GPS coordinates are not reliable enough for providing this data, data such as tire rotation can also be used to track movement of an ego vehicle.

If the movement is greater or equal to a full vehicle length (or other variable), the process can determine if there was a delta in the heading about a threshold 307. That is, did the vehicle's heading shift significantly during the movement, indicating a possible lane switch. If there was not a significant delta in the heading, the process may count 309 a vehicle in the current lane based on the movement. While vehicles may move slight amounts to tighten up traffic, movement over a certain distance may define accommodation of a vehicle through a lane. Even if the vehicle counted is a long vehicle, the movement may be counted based on a movement event breaking a threshold distance, which should accommodate the long vehicle as a single vehicle.

If the vehicle changes lanes, the process may reset 311 the count, although it may also upload any previous count data to a data set as well, so as not to lose already-gathered data. Since a vehicle will not typically stop until it is in a line of cars, using a stop as a proxy for lane-entry and commitment is a reasonable test, albeit not always a perfect one. Once the vehicle has passed the toll booth 315, the process can add 313 the vehicle count(s) to the data set for upload.

Figure 4:
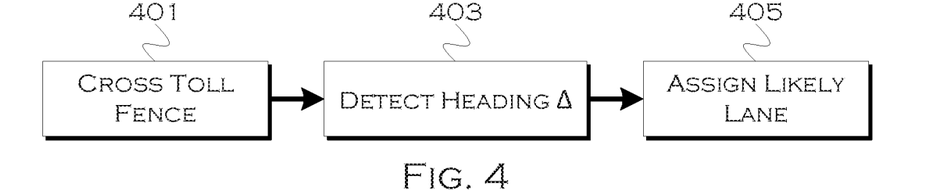
FIG. 4 shows an illustrative process for lane detection.

FIG. 4 shows an illustrative process for lane detection. In this example, the process can attempt to "guess" at which lane a vehicle will occupy for a toll. Before the stop is detected, but after the vehicle has crossed a geo-fence 401, the process can detect 403 a vehicle heading and continue to do so until the vehicle stops, resulting in a lane prediction. Because traffic exiting a highway onto a toll plaza is often constrained to several lanes, setting this particular fence at the branch point will give some assurances about a general vehicle location prior to determining the heading. That is, even if the GPS coordinates indicate a vehicle 10 feet off the road to the right, the ego vehicle is typically actually on the road, and road maps confirm the location by pinning the vehicle to the closest lane. The tolerance and misdetection is more misinforming when the vehicle has entered the plaza, because the plaza is a much less defined space, so once the road branch has been reached, the process can use heading, plus the fact of exiting a known lane at a known location, as a proxy for determining the lane to which the vehicle is heading.

Figure 5A:
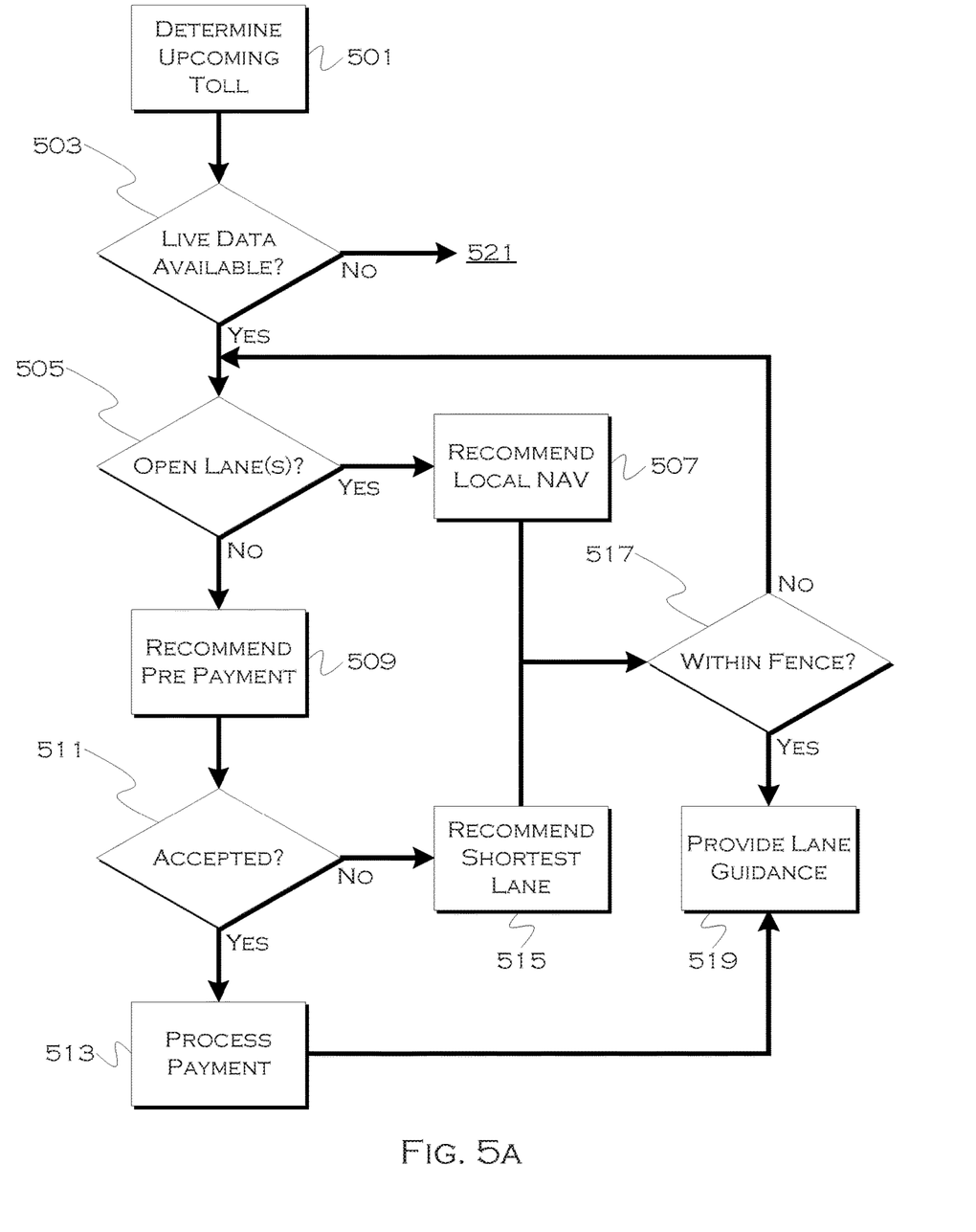
FIG. 5A shows an illustrative portion of a process for toll-handling recommendation.

FIG. 5A shows an illustrative portion of a process for toll-handling recommendation. In this example, the process begins to make recommendations for handling an upcoming toll. This can include, for example, recommending a travel lane or lanes, and/or recommending use of a pass-through lane based on early toll payment via the vehicle. Even if the vehicle does not have a transponder pass, the vehicle itself may be capable of communication with infrastructure to confirm and process payment, allowing the vehicle to use the pass-through lanes. There are a variety of reasons why travelers may not want to use these lanes, so the vehicle can make a recommendation about using the lane, in terms of time and efficiency tradeoff, for example, and the user can decide if using the lane is worthwhile.

When the process determines 501 that a toll is upcoming (this could be miles out in advance of the toll, depending on what exactly the prediction was intended to accommodate), the process can determine 503 if live data is available. Live data may be useful if the vehicle is within a certain distance of the toll booth, and other times predictive modeling may be used, even if live data is available, because the vehicle could be miles or even hours away from the booth.

If live data is available and desired, the process can determine 505 if there are currently any open lanes or lanes with low traffic below a recommendation threshold. These are lanes that would presumably be recommended for usage to pass through the booth in an efficient manner. If there are currently open lanes, the process may recommend 507 localized navigation to the lane (e.g., "go two lanes to the left of the entrance to the plaza," or "use lane 3," etc.). Once the vehicle is within the geo-fence defining the plaza, the process can provide 519 the localized guidance if so desired.

If there are not any reasonably open lanes, the process may recommend 509 prepayment via a cloud-based system. The pass-through lane may also be busy, or may not be optimally located for a manuver after the booth, so a user may not always want to use the pass-through. Or a user may be traveling with friends and everyone may be contributing to the tolls, so automatic cloud payment is not always the preferred option. This solution gives the flexibility to use the payment when desired or when it makes sense for a user, while also providing cash alternatives that are efficient versions of the non-prepaid route. Drivers may define parameters (e.g., maximum wait times) for when that driver prefers automatic payment options.

If the user accepts the prepayment recommendation 511, the process may process 513 the payment before the user arrives, and then may guide the user to the pass-through lane. If the user declines prepayment, the process may recommend 515 a shortest wait lane, even if this is not typically within the optimal definition of the wait. The process, as noted, can also consider maneuvers after a booth when recommending a lane, because a user may be willing to wait an extra two minutes in order not to have to cut across three lanes of traffic in a storm when exiting the booth.

Figure 5B:
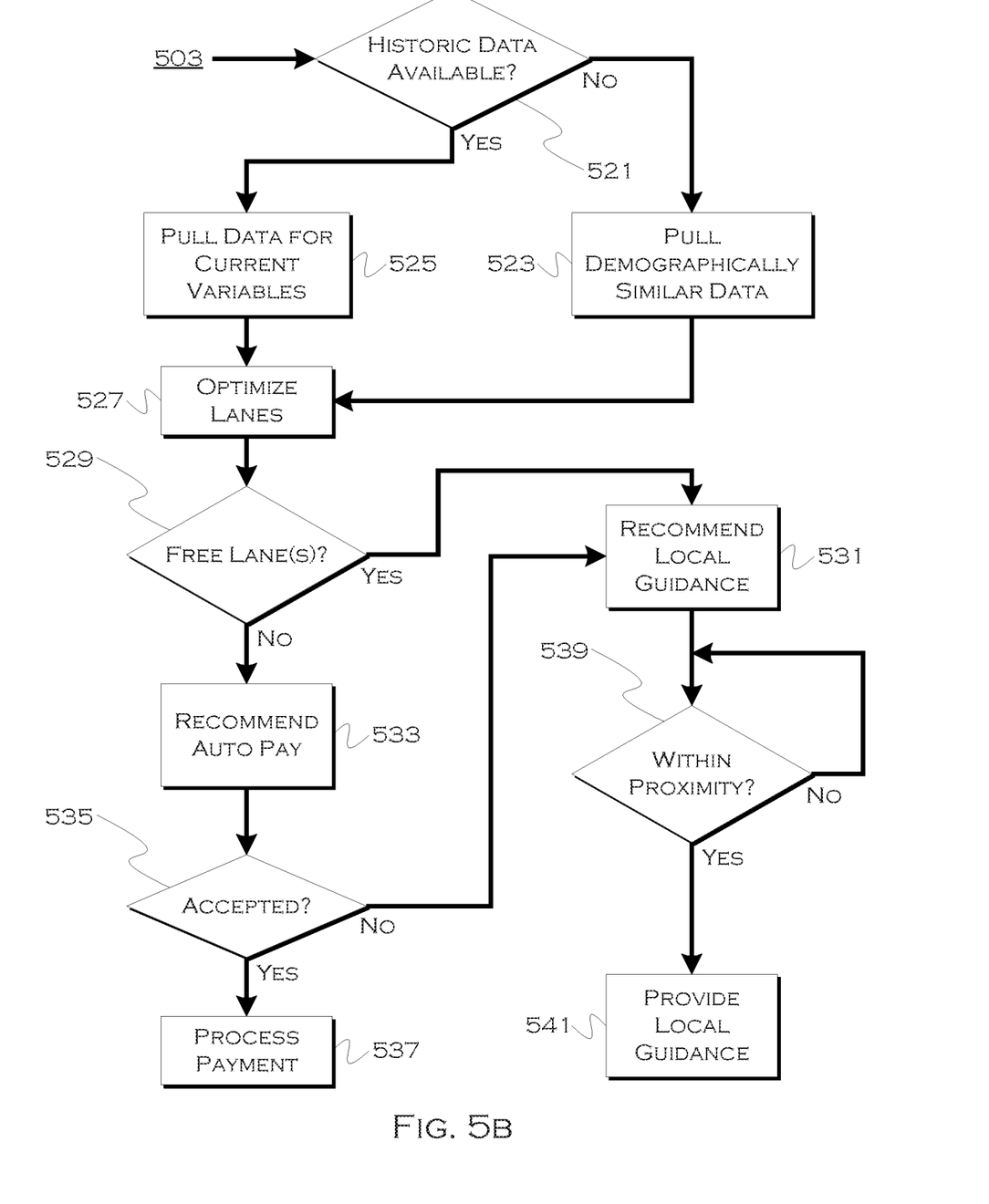
FIG. 5B shows the remainder of the illustrative process for toll-handling recommendation.

FIG. 5B shows the remainder of the illustrative process for toll-handling recommendation. In this example, the process is using predictive data based on modeling and/or historic data for a given booth, to provide a prediction about the state of the booth, either because live data was not available or because the vehicle will not arrive in a timely manner, for example.

Here, the process determines 521 if historic data is available, and if historic data for that booth is not available, the process can pull 523 data that is demographically similar to the booth. That is, data which represents similar booths at similar times for similar traffic patterns can generally be used as a proxy for a booth which does not have its own historic data available to be analyzed.

If historic data is available, the process may consider any current variables (e.g., without limitation, time of day, day of week, weather, construction, etc.) and pull 525 historic data that correlates to those variables. From the available data, the process may optimize 527 lane usage to predict a preferred lane. Optimization does not always mean choosing the historically shortest lane, but can also include considerations such as post-booth maneuvers, lane clustering, etc. For example, in a 10 lane booth, lanes 1-3 may historically have 5 vehicles each, while lane 7 may historically have 2 vehicles. But, if lanes 8, 9 and 10 all historically have 8 vehicles, the user has a higher likelihood of encountering a lower traffic lane (since this is just a prediction) by heading towards lane 2. Since the decision about which branch to take may often need to be made before the traffic at booths is completely evident, the user may not have time to reroute to lane 3 if initially choosing lane 7 and discovering that today, lane 7 is more like the historic lanes 6, 8, 9 and 10 (more crowded).

If the optimization model predicts one or more lanes below a threshold 529, the model may recommend 531 local guidance to those lane(s). Otherwise, the process may recommend 533 automatic payment. A user can always elect to automatically pay, the recommendation process can be the subset of a larger toll-facilitating application, which process is intended to simply provide optimal guidance based on present or historic factors in order to improve driving time. If the user accepts 535 the payment option, the process may process 537 the payment and facilitate pass-through via the infrastructure. The user can also decline automatic payment and be routed to the best lane predicted to be available. Again, once the vehicle is within proximity to the booth 539, the process can engage 541 localized driving directions to guide the user to the appropriate lane(s).

By leveraging present and historic data, the illustrative concepts and embodiments provide opportunities to improve the utility and functionality of traditional toll both handling. Drivers can receive lane recommendations, options and recommendations to automatically pay, and general decrease overall time in the toll plaza. This can also benefit the plaza, by keeping traffic moving through at an increased pace. The novel, uncommon and atypical examples and concepts described herein demonstrate potential improvements achievable through use of those examples, concepts, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine that a vehicle is within a threshold distance of a first tollbooth for which less than a threshold amount of historic traffic data for the tollbooth, of an amount predefined as sufficient to enable modeling, is presently available;
responsive to the vehicle being within the threshold distance and there being less than the threshold amount of at least one of present or historic traffic data, utilize historic data for one or more second tollbooths, wherein the one or more second tollbooths are chosen based on predefined selection characteristics for the one or more second tollbooths, the historic data for the one or more second tollbooths utilized for modeling traffic as a traffic projection of traffic the first vehicle is likely to encounter when passing through the first tollbooth; and
provide an in-vehicle prepayment option responsive to automatic toll prepayment being recommended based on the traffic projection indicating conditions predefined as suitable for recommending that the vehicle route to a pass-through lane of the first toll-booth requiring prepayment of the toll when the vehicle lacks a transponder for toll payment.

2. The system of claim 1, wherein the predefined selection characteristics include being within a predefined proximity to the first tollbooth.

3. The system of claim 1, wherein the predefined selection characteristics include a number-of-lanes of the one or more second tollbooths corresponding to a number-of-lanes of the first tollbooth.

4. A system comprising:
a processor configured to:
determine that a vehicle is within a threshold distance of a first tollbooth for which less than a threshold amount of present and historic traffic data, of an amount predefined as sufficient to enable modeling, is presently available;
responsive to the vehicle being within the threshold distance and there being less than the threshold amount of at least one of present or historic traffic data, utilize historic data from a second tollbooth, sharing at least one predefined characteristic with the first tollbooth, for modeling traffic as a traffic projection of traffic the first vehicle is likely to encounter when passing through the first tollbooth;
determine, based on the traffic projection, a recommended lane for passage through the tollbooth; and
recommend the determined lane to a driver.

5. The system of claim 4, wherein the recommended lane is determined based on projected wait times based on the traffic projections.

6. The system of claim 4, wherein the recommended lane is determined based on a next-maneuver, indicated by an input route, following tollbooth exit.

* * * * *